United States Patent
Hayashi et al.

(10) Patent No.: US 8,404,762 B2
(45) Date of Patent: Mar. 26, 2013

(54) METHOD FOR PRODUCTION OF CORE-SHELL MICROPARTICLE, AND METHOD FOR PRODUCTION OF MONODISPERSE CROSSLINKED MICROPARTICLE HAVING ALKOXYAMINE GROUP FOR USE AS INTERMEDIATE FOR THE PRODUCTION OF THE CORE-SHELL MICROPARTICLE

(75) Inventors: Masaki Hayashi, Aichi-ken (JP); Masumi Takamura, Aichi-ken (JP)

(73) Assignee: NOF Corporation, Tokyo (JP)

( * ) Notice: Subject to any disclaimer, the term of this patent is extended or adjusted under 35 U.S.C. 154(b) by 675 days.

(21) Appl. No.: 12/530,387

(22) PCT Filed: Mar. 9, 2007

(86) PCT No.: PCT/JP2007/054689
§ 371 (c)(1),
(2), (4) Date: Oct. 12, 2009

(87) PCT Pub. No.: WO2008/111140
PCT Pub. Date: Sep. 18, 2008

(65) Prior Publication Data
US 2010/0113704 A1 May 6, 2010

(51) Int. Cl.
*C08F 291/00* (2006.01)
(52) U.S. Cl. ............ 523/201; 525/328.2; 525/243; 525/259; 564/300; 514/315
(58) Field of Classification Search ............ 525/328.2, 525/243, 259, 902; 523/201; 564/300; 514/315
See application file for complete search history.

(56) References Cited

U.S. PATENT DOCUMENTS

| | | | |
|---|---|---|---|
| 5,455,315 A * | 10/1995 | Paine et al. | 526/79 |
| 6,919,481 B1 | 7/2005 | Hayashi et al. | |
| 2002/0040117 A1 | 4/2002 | Guerret et al. | |

FOREIGN PATENT DOCUMENTS

| | | |
|---|---|---|
| JP | 2001-64308 A | 3/2001 |
| JP | 2001-261760 A | 9/2001 |
| JP | 2001-270859 A | 10/2001 |
| JP | 2003-82014 A | 3/2003 |
| JP | 2004-18556 A | 1/2004 |
| JP | 2004-18557 A | 1/2004 |
| JP | 2004-331817 A | 11/2004 |

OTHER PUBLICATIONS

Machine Translation of JP 2004-18556 (2012).*
Partial English Translation of JP 2004-18556 (2012).*
Bian, Kejian et al., "Synthesis of Polymeric Microspheres from a Merrifield Resin by Surface-Initiated Nitroxide-Mediated Radical Polymerization," Journal of Polymer Science: Part A: Polymer Chemistry, vol. 43 (2006) pp. 2145-2154.

* cited by examiner

*Primary Examiner* — Mark Kaucher
(74) *Attorney, Agent, or Firm* — Seager, Tufte & Wickhem LLC

(57) ABSTRACT

Disclosed is a core-shell microparticle (10) which is produced by heating a mixture of a crosslinked microparticle (11) having an alkoxyamine group (12) and a monomer to 100 to 180° C. to cause graft polymerization. The crosslinked microparticle (11) is produced by allowing a seed particle to absorb a monomer mixture comprising 15 to 99% by mass of a crosslinkable monomer and 1 to 85% by weight of a monomer having an alkoxyamine group, and then adding a polymerization initiator to the resulting product to cause the polymerization of the monomer mixture.

7 Claims, 1 Drawing Sheet

METHOD FOR PRODUCTION OF CORE-SHELL MICROPARTICLE, AND METHOD FOR PRODUCTION OF MONODISPERSE CROSSLINKED MICROPARTICLE HAVING ALKOXYAMINE GROUP FOR USE AS INTERMEDIATE FOR THE PRODUCTION OF THE CORE-SHELL MICROPARTICLE

TECHNICAL FIELD

The present invention relates to a method for producing a core-shell microparticle by producing an alkoxyamine group-containing monodisperse crosslinked microparticle by an alkoxyamine group serving as a living radical polymerization initiating group and forming a graft chain on the microparticle.

BACKGROUND ART

Various types of polymer microparticles have been developed and put in use in a wide variety of fields. The smaller polymer microparticles, the easier the particles aggregate. Accordingly, in view of handling and the like, polymer microparticles of a micron size or more have been frequently used. However, with the recent progress in nano-technology, it has been required to further reduce the size of polymer microparticles. For example, since submicron-size corresponds to the wavelength of visible light, new uses of microparticles have been developed using optical characteristics such as scattering and interference. Of them, for forming a colloidal crystal, in which microparticles are three-dimensionally and densely packed, a narrow particle size distribution, i.e. monodispersibility is also required.

A core-shell microparticle formed of not less than two types of polymers in combination is a functional composite microparticle having a high performance and high functional surface. In the core-shell microparticle, the polymer chains forming the shell with a sufficient density are each connected to the surface of the core microparticle at an end. In a method for producing a core-shell microparticle, recently, attention has been drawn to dense formation of a graft chain using living radical polymerization starting from the surface of a polymer microparticle. The dense formation of a graft chain contributes to sterical repulsion, which suppresses aggregation of the particles.

A method for producing a core-shell microparticle is, for example, proposed in Non-Patent Document 1. In this production method, a microparticle having a functional group such as chloride is formed in advance and then, reacted with a nitroxide compound. In this manner, an alkoxyamine group, which serves as a living radical polymerization initiating group, is introduced into the surface of the polymer microparticle. Subsequently, graft polymerization is performed based on an alkoxyamine group to form a core-shell microparticle.

Furthermore, a method for producing a core-shell microparticle by polymerizing a monomer containing an atom transfer radical polymerization (ATRP) initiating group and divinylbenzene in accordance with precipitation polymerization in an acetonitrile solvent to form a microparticle containing an ATRP initiating group, and performing graft polymerization based on the ATRP initiating group, is disclosed (see, for example, Patent Document 1).

Non-Patent Document 1: J. Polym. Sci. Part A: Polym. Chem., 43, 2145-2154 (2005)

Patent Document 1: Japanese Patent Laid-Open No. 2004-18556 (pages 2, 4 and 5)

DISCLOSURE OF THE INVENTION

However, in the method described in Non-Patent Document 1, since a core microparticle contains only 1 to 2% of a crosslinking agent, the crosslink density is low. Therefore, when a shell layer is formed on the surface of a core microparticle by graft polymerization, the core microparticle is swollen by the monomer forming the shell layer and polymerization proceeds also in the interior portion of the core microparticle. Accordingly, the particle size increases beyond a desired size, with the result that only a core-shell microparticle having a size of several tens of micrometers can be obtained. As described above, since a part of a shell layer invades into the interior portion of a core microparticle, the function of the core microparticle cannot be clearly distinguished from the function of the shell layer. Accordingly, when such a core-shell microparticle is used as a functional composite microparticle, it cannot play a sufficient role thereof. This is a problem.

Furthermore, in introducing an alkoxyamine group into a polymer microparticle surface, a nitroxide compound is reacted with a microparticle previously produced. Therefore, a step of re-dispersing the microparticle previously produced and a step of removing an unreacted reagent are required. Thus, this method is industrially unfavorable.

In the method of Patent Document 1, a microparticle having high crosslink density and containing an ATRP initiating group is obtained. However, only a micron-size microparticle having an average particle size of 2 to 5 μm can be obtained. In other words, a submicron-size microparticle cannot be obtained. In addition, since a core microparticle is bound to a shell layer via an ester bond, the structure is easily broken by an ionic reaction, with the result that the shell layer tends to dissociate from the core microparticle. Thus, the physical properties as a core-shell microparticle cannot be sufficiently expressed. This is a problem.

It is an object of the present invention to provide a method for producing a core-shell microparticle, capable of forming a microparticle in the order of a submicron size without swelling a core microparticle and capable of distinguishing the function of the core microparticle from that of the shell layer, and sufficiently serving as a functional composite microparticle. It is another object to provide a production method for an alkoxyamine group-containing monodisperse crosslinked microparticle. This is a method for simply obtaining a microparticle containing an alkoxyamine group serving as a living radical polymerization initiating group, being uniform in particle size, and having high crosslink density.

In an aspect of the present invention, a monomer mixture containing a crosslinkable monomer (15 to 99% by mass) having a plurality of vinyl groups and an alkoxyamine group-containing monomer (1 to 85% by mass) is prepared. A monodispersed organic seed particle is impregnated with the monomer mixture in the presence of an aqueous medium. Then, a polymerization initiator is added to initiate polymerization of the monomer mixture to produce a monodisperse crosslinked microparticle having an alkoxyamine group introduced thereto. Then, the monodisperse crosslinked microparticle and a monomer are heated to polymerize them in accordance with graft polymerization. In this manner, a core-shell microparticle is produced.

BEST MODE FOR CARRYING OUT OF THE INVENTION

A method for producing a core-shell microparticle in accordance with an embodiment of the present invention will be described below. In the specification "microparticle" refers to a particle having as a size (e.g., diameter) of less than 1 micrometer, in short, a submicron particle.

The core-shell microparticle of the present invention is produced first by producing an alkoxyamine group-containing monodisperse crosslinked microparticle (hereinafter also referred to sometimes as an intermediate or simply as a crosslinked microparticle), blending a monomer with the crosslinked microparticle and performing graft polymerization by heating. The monomer is polymerized with an alkoxyamine group present on the surface of the crosslinked microparticle in accordance with living radical polymerization. As a result, a monomer graft chain is formed on the surface of the crosslinked microparticle to form a shell layer. The living radical polymerization means radical polymerization free from an inactivation reaction such as a reaction between radicals.

Figure 1:
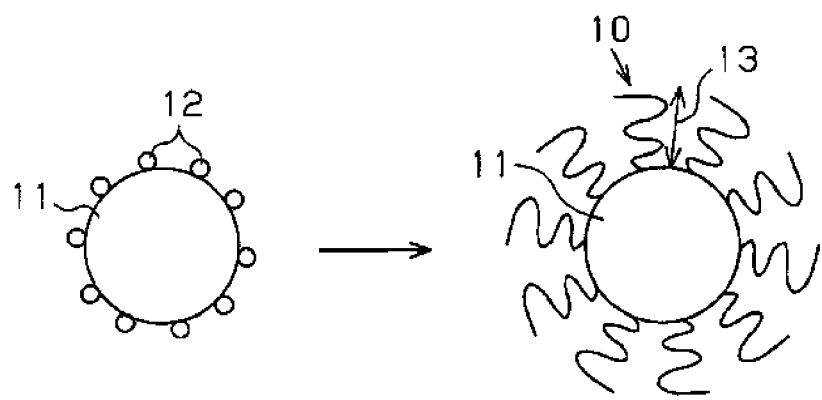
FIG. 1 is a schematic view of an alkoxyamine group-containing monodisperse crosslinked microparticle and a core-shell microparticle.

This method will be described with reference to FIG. 1. A monodisperse crosslinked microparticle 11 has the outer peripheral surface having numeral alkoxyamine groups 12 densely fixed thereon. When a monomer mixture is blended with the monodisperse crosslinked microparticle 11 and polymerization (living radical polymerization) is performed, the monodisperse crosslinked microparticle 11 forms a core (core microparticle) and graft polymerization of the monomer mixture starts from the alkoxyamine groups 12 to form numeral graft chains. The numeral graft chains form a shell (shell layer) 13. In this manner, a core-shell microparticle 10 is produced. In this graft copolymer, the core microparticle corresponds to a stem component and the shell layer corresponds to a branched component.

In the method for producing a crosslinked microparticle, a monodispersed organic seed particle dispersed in an aqueous medium is impregnated with a monomer mixture, which contains a crosslinkable monomer (15 to 99% by mass) having a plurality of vinyl groups (two or more) and an alkoxyamine group-containing monomer (1 to 85% by mass). Then, a polymerization initiator is added to initiate polymerization of the monomer mixture. In this case, as the monomer, a monomer (second monomer) except the aforementioned crosslinkable monomer and the alkoxyamine group-containing monomer can be optionally added.

First, a method for producing a monodispersed organic seed particle (hereinafter also referred to simply as a seed particle) will be described. The seed particle is produced by polymerizing a monomer in an aqueous medium by use of a reactive emulsifying agent or the like. As the polymerization method, a known polymerization method such as a soap-free (no surfactant) emulsification polymerization method, a dispersion polymerization method, a suspension polymerization method and an emulsification polymerization method are applicable. Of them, the soap-free emulsification polymerization method is preferably used since a clean particle surface is obtained and monodispersibility, i.e., a narrow particle size distribution, is shown. As a dispersion medium for producing a seed particle, an aqueous medium is used to avoid dissolution of an oil soluble monomer and a seed particle in a dispersion medium. As the aqueous medium, usually water is used; however, water containing a small amount of lower alcohol or the like may be used.

As the monomer for forming a seed particle, styrene, butadiene, (meth)acrylate, etc. may be mentioned. As the polymer for forming a seed particle, a styrene polymer; a styrene copolymer such as a styrene-butadiene copolymer and a styrene-(meth)acrylate copolymer; and (meth)acrylate polymers and copolymers such as a methyl methacrylate polymer may be mentioned. Likewise, the seed particle is formed of an organic compound. Furthermore, the polymer is preferably a noncrosslinked particle or a slightly-crosslinked microparticle obtained by polymerizing a mixture containing a crosslinkable monomer having a plurality of vinyl groups, such as divinylbenzene, in an amount of not more than 2% by mass. In this case, in producing a crosslinked microparticle, a crosslinked microparticle having a crosslinked structure of the microparticle and alkoxyamine groups of the surface thereof can be easily obtained.

The seed particle can be appropriately selected depending upon the average particle size of the crosslinked microparticle to be obtained. The average particle size is usually 10 to 800 nm and preferably 30 to 700 nm. The particle size distribution of the seed particles is expressed by a CV value calculated in accordance with the expression:

(Particle size standard deviation/average particle size)×100

The CV value is preferably 20% or less and more preferably 15% or less. When the CV value is set at 20% or less, the particle size distribution of seed particles is narrowed and sharpened. The monodispersion herein means that the particle size distribution is narrow, more specifically, means that the CV value is small as mentioned above.

The particle size of the seed particle can be controlled by varying the polymerization temperature, the concentration of a monomer, the amount of polymerization initiator and the amount of emulsifying agent (reactive emulsifying agent), etc. For example, the particle size of the seed particle can be reduced by employing sodium p-styrene sulfonate as the reactive emulsifying agent and increasing the content thereof.

Next, a method for producing an alkoxyamine group-containing monodisperse crosslinked microparticle will be described. To obtain the crosslinked microparticle, the seed particle is impregnated with a monomer mixture and the polymerization of the monomer mixture is performed in the presence of a polymerization initiator. The polymerization is usually performed by blending the seed particle, the monomer mixture and the polymerization initiator in an aqueous medium. More specifically, first, the monomer mixture is added to a suspension solution of the seed particle and absorbed. Alternatively, the monomer is previously dispersed in an aqueous medium and the suspension solution of a seed particle may be added to the dispersion. The addition manner is not particularly limited and any one of the addition manners such as simultaneous addition, separate addition and continuous addition may be employed.

The content of the monomer mixture is preferably 50 to 2000 parts by mass relative to the seed particle (100 parts by mass). When the content is less than 50 parts by mass, the amount of crosslinking component decreases, with the result that the mechanical strength of a crosslinked microparticle becomes insufficient; at the same time, the content of an alkoxyamine group decreases. On the other hand, when the content exceeds 2000 parts by mass, the particle size distribution of a crosslinked microparticles is broadened and the production of an aggregate increases. For this reason, these cases are not preferable.

The monomer mixture contains a crosslinkable monomer having a plurality of vinyl groups in an amount of 15 to 99% by mass, preferably 50 to 97% by mass and more preferably, 70 to 95% by mass. When the content of the crosslinkable monomer is less than 15% by mass, the crosslink density of the crosslinked microparticle decreases with the result that the mechanical strength becomes insufficient. Furthermore, in producing a core-shell microparticle, a core microparticle is swollen by the monomer forming the shell layer and polymerization proceeds within the core microparticle. As a result, the particle size increases beyond a desired size. In addition, the monomer forming the shell layer invades into the interior portion of the microparticle. As a result, the core-shell microparticle cannot play a role as a functional composite microparticle. On the other hand, when the content of the crosslinkable monomer exceeds 99% by mass, relatively, the content of the alkoxyamine group-containing monomer decreases and a grafting rate decreases. As a result, a desired shell layer cannot be formed.

As the crosslinkable monomer, for example, a multifunctional monomer may be mentioned, which includes divinylbenzene, divinylnaphthalene, ethylene glycol di(meth)acrylate, tetraethylene glycol di(meth)acrylate, 1,6-hexanediol di(meth)acrylate, trimethylolpropane tri(meth)acrylate and tetramethylolpropane (meth)acrylate. The crosslinkable monomers may be used alone or in appropriate combination of two types or more.

The monomer mixture contains an alkoxyamine group-containing monomer in an amount of 1 to 85% by mass, preferably 3 to 50% by mass, and more preferably 5 to 30% by mass. When the content of the monomer is less than 1% by mass, the grafting density is excessively low in producing a core-shell microparticle, with the result that the effect of a functional composite microparticle cannot be exerted. On the other hand, when the content exceeds 85% by mass, relatively, the content of the crosslinkable monomer decreases, with the result that the crosslink density of the crosslinked microparticle decreases. For this reason, these cases are not preferable.

As the alkoxyamine group-containing monomer, a known compound can be used; however, a compound represented by the following general formula (1) is preferred.

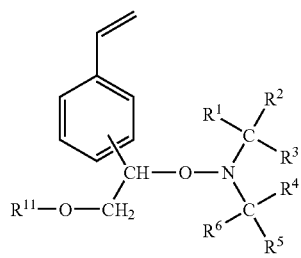

(1)

Where $R^1$ to $R^6$ are each independently selected and represent hydrogen, a hydrocarbon group (—$R^7$), an ester group (—$COOR^8$), an alkoxy group (—$OR^9$) or a phosphonate group (—$PO(OR^{10})_2$), in which $R^7$ to $R^{10}$ each independently represent a straight chain, branched chain or cyclic saturated or unsaturated hydrocarbon group having 1 to 8 carbon atoms; and $R^3$ and $R^4$ may be mutually joined to form a ring having 3 to 12 carbon atoms. The hydrogen atom present on the ring may be unsubstituted or substituted by an alkyl group having 1 to 4 carbon atoms, a hydroxyl group, an acetoxy group, a benzoyloxy group, a methoxy group or an oxo group; $R^{11}$ represents hydrogen, a tertiary alkyl group having 4 to 8 carbon atoms, benzoyl group, methylbenzoyl group, or a $COOR^{12}$ group; $R^{12}$ represents a straight chain or branched chain alkyl group or alkoxyalkyl group having 1 to 10 carbon atoms; or an unsubstituted cycloalkyl group or a cycloalkyl group having a substituent on the ring.

The alkoxyamine group-containing monomer can be easily synthesized in accordance with a customary method. For example, the alkoxyamine group-containing monomer is produced by heating divinylbenzene, a nitroxide compound and an organic peroxide to the thermolysis temperature of the organic peroxide. Specific examples of the alkoxyamine group-containing monomer include 2-(2',2',6',6'-tetramethyl-1'-piperidinyloxy)-2-(4'-vinylphenyl)ethanol, 2-(4'-hydroxy-2',2',6',6'-tetramethyl-1'-piperidinyloxy)-2-(4'-vinylphenyl)ethanol, 2-t-butoxy-1-(4'-hydroxy-2',2',6',6'-tetramethyl-1'-piperidinyloxy)-1-(4'-vinylphenyl)ethane, 2-t-butoxy-1-(4'-benzoyloxy-2',2',6'6'-tetramethyl-1'-piperidinyloxy)-1-(4'-vinylphenyl)ethane, 2-benzoyloxyl-1-(2',2',6,6'-tetramethyl-1'-piperidinyloxy)-1-(4'-vinylphenyl)ethane, 2-isopropyloxycarbonyloxy-1-(4'-acetoxy-2',2',6',6'-tetramethyl-1'-piperidinyloxy)-1-(4'-vinylphenyl)ethane, 2-(2'-ethylhexyloxycarbonyloxy)-1-(4'-methoxy-2',2',6',6'-tetramethyl-1'-piperidinyloxy)-1-(4'-vinylphenyl)ethane, 2-(4'-hydroxy-2',2',6,6-tetramethyl-1-piperidinyloxy)-2-(3'-vinylphenyl)ethanol, 2-isopropyloxycarbonyloxy-1-(2',2',6',6-tetramethyl-1'-piperidinyloxy)-1-(4'-isopropenylphenyl)ethane, 2-isopropyloxycarbonyloxy-1-(2',2',5',5'-tetramethyl-1-pyrrolidinyloxy)-1-(4'-vinylphenyl)ethane, 2-t-butoxy-1-(N,N-di-t-butylaminooxy)-1-(4'-vinylphenyl)ethane, 2-(N-t-butyl-N-(2'-methyl-1-phenylpropyl)aminooxy)-2-(4'-vinylphenyl)ethanol and 2-isopropyloxycarbonyloxy-1-(N-t-butyl-N-(1'-diethylphosphono-2',2'-dimethylpropyl)aminooxy)-1-(4'-vinylphenyl)ethane. These monomers can be used alone or in appropriate combination with two types or more.

The second monomer forms the shell layer of a core-shell microparticle and serves for maintaining mechanical property thereof and responsible for expressing functionality. The second monomer is preferably blended with a monomer mixture. Examples of the second monomer include styrene monomers such as styrene, p-methylstyrene, α-methylstyrene, 2-vinylnaphthalene, p-chloromethylstyrene, p-methoxystyrene and ethylvinylbenzene; (meth)acrylate monomers such as methyl (meth)acrylate, ethyl (meth)acrylate, butyl (meth)acrylate, 2-ethylhexyl (meth)acrylate, cyclohexyl (meth)acrylate, 2-hydroxyethyl (meth)acrylate and glycidyl (meth)acrylate; unsaturated carboxylic acid monomers such as (meth)acrylic acid and crotonic acid; unsaturated dicarboxylic acid monomers such as maleic acid, fumaric acid and itaconic acid; acid anhydride monomers such as maleic anhydride and itaconic anhydride; fumarate monomers such as dimethyl fumarate and dicyclohexyl fumarate; isocyanate group-containing monomers such as 2-isocyanate ethyl (meth)acrylate and m-isopropenyl-α,α-dimethylbenzyl isocyanate; nitrogen-containing alkyl (meth)acrylates such as N,N-dimethylaminoethyl (meth)acrylate and N-t-butylaminoethyl (meth)acrylate; amide group-containing monomers such as acrylamide, N,N-dimethyl(meth)acrylamide and N-isopropylacrylamide; aromatic-group containing nitrogen monomers such as 2-vinylpyridine and 4-vinylpyridine; conjugated diene monomers such as butadiene, isoprene and chloroprene; vinyl ester monomers such as vinyl acetate; vinyl pyrrolidone, vinyl carbazole and acrylonitrile. As the second monomer, optionally, functional monomers such as a water soluble monomer, an ionic monomer, a monomer having a functional group can be used. Of these, a styrene monomer or a (meth)acrylate monomer is preferably used. Furthermore, these monomers can be used alone or in combination to two types or more depending upon the purpose.

The content of the second monomer is preferably not more than 500 parts by mass per the total amount of the crosslinkable monomer and the alkoxyamine group-containing monomer (100 parts by mass), more preferably, 5 to 300 parts by mass, and particularly preferably 10 to 200 parts by mass. In this case, the content of a crosslinkable monomer and the content of the alkoxyamine group-containing monomer in the total amount of the crosslinkable monomer, the alkoxyamine-containing monomer and the second monomer are preferably not less than 15% by mass and not less than 1% by mass, respectively. When the content of the second monomer exceeds 500 parts by mass, relatively, the content of a crosslinkable monomer or an alkoxyamine group-containing monomer decreases, with the result that the crosslink density of the crosslinked microparticle decreases and initiation of living radical polymerization is delayed. For this reason, this case is not preferable.

As the polymerization initiator to be used in polymerizing the monomer mixture, a known radical polymerization initiator, more specifically, a known oil soluble polymerization initiator or a known water soluble polymerization initiator can be used. Examples of the oil soluble polymerization initiator include organic peroxides such as benzoyl peroxide, lauroyl peroxide, t-butylperoxy-2-ethyl hexanoate, diisopropylperoxydicarbonate and 1,1-bis(t-butylperoxy)cyclohexane; and azo compounds such as 2,2'-azobisisobutyronitrile and 2,2'-azobis(2,4-dimethylvaleronitrile). Examples of the water soluble polymerization initiator include persulfates such as potassium persulfate and ammonium persulfate; 4,4'-azobis-4-valerate and 2,2'-azobis-2-aminodinopropane hydrochloride.

An oil soluble polymerization initiator can be used by dissolving the oil soluble polymerization initiator in the monomer mixture. A water soluble polymerization initiator can be used by dissolving the water soluble polymerization initiator in an aqueous medium. The content of a polymerization initiator is appropriately set depending upon the type of monomer mixture and the polymerization temperature, etc.; however, it is usually 0.01 to 10 parts by mass relative to 100 parts by mass of the monomer mixture, and preferably 0.1 to 5 parts by mass.

Furthermore, to the monomer mixture, an emulsifying agent or a dispersion stabilizer can be optionally blended. Examples of the emulsifying agent include alkylbenzene sulfonates such as sodium dodecyl benzene sulfonate, sulfates such as sodium tetradecyl sulfate, fatty acid salts such as sodium laurate, and polyethylene glycol alkyl ethers such as polyethylene glycol nonylphenyl ether. These emulsifying agents may be used singly or in combination with two types or more. Examples of the dispersion stabilizer include polyvinylpyrrolidone, polyvinyl alcohol, partly-saponified polyvinyl alcohol, methylcellulose, polyacrylic acid, polyacrylic acid copolymer, neutralized products of these and polymethacrylic acid, polymethacrylic acid copolymers and neutralized products of these. These dispersion stabilizers may be used singly or in combination with two types of more.

Polymerization conditions of a monomer mixture can be appropriately selected depending upon the type of monomer, etc.; however, generally, polymerization is performed preferably under stirring at a polymerization temperature of 30 to 90° C. for 3 to 48 hours. The polymerized microparticle is centrifugally separated or salted out and thereafter filtrated to thereby remove the water layer. The resultant substance is washed with water and an organic solvent and dried. In this manner, the microparticle can be purified and isolated.

In the crosslinked microparticle thus obtained, since a polar component tends to be oriented toward the surface, almost all alkoxyamine groups serving as a polymerization initiating group are oriented toward the surface. The crosslinked microparticle has an average particle size (measured by a dynamic light scattering method in a good solvent) of preferably 50 to 900 nm and further preferably 80 to 800 nm. When the average particle size is set within the above range, the size of the crosslinked microparticle can be set in the order of submicron. The case where the average particle size is less than 50 nm is not preferred, because it becomes difficult to produce crosslinked microparticle. On the other hand, when the average particle size exceeds 900 nm, the crosslinked microparticle of a micron size is resulted. As a result, optical characteristics such as light scattering and interference cannot be sufficiently obtained.

Furthermore, the CV value of the crosslinked microparticle is preferably 20% or less and further preferably 15% or less. When the CV value of the crosslinked microparticle is set at 20% or less, the particle size distribution of the crosslinked microparticle can be narrowed and the characteristics of the core-shell microparticle can be improved. When the CV value exceeds 20%, the particle size distribution of the crosslinked microparticle becomes broad. As a result, the characteristics of the core-shell microparticle become weak or unstable. In addition, the crosslinked microparticle, since it has a crosslinked structure densely formed, exhibits extremely satisfactory solvent resistance. Accordingly, the crosslinked microparticle is not dissolved or deformed in a monomer such as styrene and methyl methacrylate and in an organic solvent such as toluene, tetrahydrofuran, acetone and dichloromethane. In addition, the crosslinked microparticle is swollen but extremely slightly in an organic solvent. Therefore, functions of the core layer and the shell layer of the core microparticle can be sufficiently distinguished.

Next, a method for producing a core-shell microparticle will be described. In the method, graft-polymerization of a monomer is performed by an alkoxyamine group present on the outer peripheral surface of the above crosslinked microparticle. By the graft polymerization, a core-shell microparticle having a shell layer formed around the core microparticle can be obtained as a graft copolymer. As the polymerization method, a known polymerization method may be employed, which includes a mass polymerization method, a suspension polymerization method, a solution polymerization method and an emulsion polymerization method. The polymerization method is appropriately selected depending upon the type of monomer, the polymerization temperature and the desired molecular weight, etc.

For example, as the solvent when a solution polymerization method is employed, a solvent for dissolving a monomer for forming a shell layer and a polymer thereof is selected. Examples of such a solvent may include aromatic hydrocarbon solvents such as toluene and xylene; ketone solvents such as methylethyl ketone and isobutyl ketone; ester solvents such as butyl acetate; alcohol solvents such as methanol and butyl alcohol; ethylene glycol solvents such as ethylene glycol, ethylene glycol monomethyl ether and ethylene glycol monomethyl ether acetate; diethylene glycol solvents such as diethylene glycol and diethylene glycol dimethyl ether; propylene glycol solvents such as propylene glycol and propylene glycol methyl ether acetate; and nitrogen or sulfur containing organic compounds such as N,N-dimethyl formamide, acetonitrile and dimethyl sulfoxide. These solvents may be used singly or as a mixture.

The monomer to be used for producing a core-shell microparticle can be appropriately selected from the aforementioned second monomers to be used in producing a crosslinked microparticle, depending upon the physical properties required for the core-shell microparticle. However, the types of monomers to be selected for a core microparticle and a shell layer desirably differ in order for the core-shell microparticle to serve as a functional composite microparticle. The content of the monomer is appropriately set depending upon the desired molecular weight of the shell layer. The content of the monomer is usually 10 to 10000 parts by mass relative to the crosslinked microparticle (100 parts by mass) and more preferably 100 to 2000 parts by mass.

To perform polymerization such that graft chains extend uniformly from the surface of a core microparticle surface and to suppress aggregation of the core microparticles, a non-vinyl type alkoxyamine may be optionally added. Examples of such an alkoxyamine include 2-(4'-hydroxy-2', 2',6',6'-tetramethyl-1'-piperidinyloxy)-2-phenylethanol, 2-(N-t-butyl-N-(2'-methyl-1-phenylpropyl)aminooxy)-2-phenylethanol and 2-isopropyloxycarbonyloxy-1-(N-t-butyl-N-(1'-diethylphosphono-2',2'-dimethylpropyl)aminooxy)-1-phenylethane.

The polymerization temperature for producing a core-shell microparticle is preferably 100 to 180° C. and further preferably 105 to 140° C. The case where the polymerization temperature is less than 100° C. is not preferred, since the decomposition rate of alkoxyamine decreases, with the result that polymerization time increases. On the other hand, the case where the temperature is higher than 180° C. is not preferred, since it becomes difficult to control the polymerization rate and polymerization from the surface of a core microparticle cannot be performed uniformly, with the result that grafting density decreases. After polymerization, centrifugation is performed to take out a microparticle. The microparticle is washed with an organic solvent and dried to produce a core-shell microparticle. The core-shell microparticle produced by this method has a spherical shape or a nearly spherical shape and a uniform particle size in the order of submicron (0.1 order).

Function of the embodiment will be described. The seed particle, which is obtained by polymerization of a monomer by use of a reactive emulsifying agent in an aqueous medium, has a submicron size and is mono dispersed. Subsequently, the seed particle is impregnated with a monomer mixture and then the monomer mixture is polymerized by use of a polymerization initiator to produce a crosslinked microparticle. At this time, since a crosslinkable monomer is contained in the monomer mixture in an amount of 15 to 99 by mass, thereby increasing the cross link density of a crosslinked microparticle, invasion of the monomer into the core microparticle can be suppressed. Therefore, the crosslinked microparticle can maintain the size of the seed particle.

Finally, the core-shell microparticle is produced by blending a monomer to a crosslinked microparticle and heating the mixture at 100 to 180° C. to perform graft polymerization. At this time, since an alkoxyamine group is present in the outer peripheral surface of a crosslinked microparticle and living radical polymerization is performed based on the alkoxyamine group, the graft polymerization proceeds rapidly to form a shell layer around the crosslinked microparticle. In this manner, a core-shell microparticle is produced having a shell layer formed around the core microparticle (a crosslinked microparticle). In this case, since the core microparticle has a high crosslink density and densely formed, a monomer rarely invades into the core microparticle. Thus, the shell layer can be formed around the core microparticle by polymerization of the monomer while the core microparticle maintains its size unchanged.

Advantages of the embodiment will be described.

In the method of the embodiment, a core-shell microparticle is produced by heating a crosslinked microparticle and a monomer. In this case, the crosslinked microparticle is produced by impregnating a seed particle with a monomer mixture, which contains a crosslinkable monomer in an amount of 15 to 99% by mass and an alkoxyamine group-containing monomer in an amount of 1 to 85% by mass, followed by polymerizing the monomer mixture by use of a polymerization initiator. Therefore, if the size of the seed particle is previously set at a submicron size, the size thereof can be maintained. As a result, the core-shell microparticle can be formed in a submicron size without swelling of the core microparticle. Simultaneously, the functions of the core microparticle and the shell layer can be distinguished and the core-shell microparticle can play a role sufficiently as a functional composite microparticle.

Furthermore, the method for producing a crosslinked microparticle is performed by impregnating monodispersed organic seed particle dispersed in an aqueous medium with a monomer mixture, which contains a crosslinkable monomer (15 to 99% by mass) and an alkoxyamine group-containing monomer (1 to 85% by mass), and polymerizing the monomer mixture by use of a polymerization initiator. In this case, if the monodispersed organic seed particle is previously prepared so as to have a uniform submicron size and polymerization is performed by increasing the amount of crosslinkable monomer, the particle size, distribution and crosslink density of the crosslinked microparticle can be easily set. Accordingly, a microparticle containing an alkoxyamine group serving as a living radical polymerization initiating group, being uniform in particle size and having high crosslink density can be prepared by a simple method.

The living radical polymerization initiation ability can be improved if the above alkoxyamine group-containing monomer is a monomer represented by the above general formula (1).

The average particle size of the crosslinked microparticle measured by a dynamic light scattering method in a good solvent is 50 to 900 nm and the CV value of the crosslinked microparticle is 20% or less. The crosslinked microparticle has a submicron size and is monodispersed.

In producing a crosslinked microparticle, an organic solvent and a metal complex, etc. are not required. Furthermore, a crosslinked microparticle can be obtained by a method without requiring a step of redispersing a microparticle and a step of removing an unreacted reagent.

A monodisperse crosslinked microparticle having a core microparticle and an alkoxyamine group bound to each other via a carbon-carbon bond can be obtained. Graft polymerization is performed using the monodisperse crosslinked microparticle as a core microparticle to obtain a core-shell microparticle having a core microparticle and the shell layer bound to each other via a carbon-carbon bond, which is stable to an ionic reaction. Therefore, for example, if a coating film is formed using the core-shell microparticle, the film is excellent in water resistance, acid-rain resistance and weather resistance, etc.

In a conventional method for producing a crosslinked microparticle, a large amount of organic solvent is indispensably used. However, the method of this embodiment, since it can be performed without using an organic solvent, is industrially favorable.

Since the core-shell microparticle is mono dispersed, it is effectively used in forming a colloidal crystal, etc., in which a microparticle is three-dimensionally and densely packed. In addition, since the core-shell microparticle has a submicron size, scattering and interference of visible light can be used. Therefore, they are useful as an optical material.

Besides these, since a functional monomer can be easily polymerized with a core microparticle or a shell layer, such a core-shell microparticle can be used as a carrier for a biological medical diagnostic agent, a cosmetic material, a paint, a powdery lubricant, a microcapsule and a liquid chromatography column loading agent, etc., and thus are extremely useful in various fields.

Examples and Comparative Examples will be described below; however, the present invention is not limited to these examples.

How to measure an average particle size, CV value and polymerization conversion rate will be described.

1) Average Particle Size and CV Value

Microparticles are dispersed in water or tetrahydrofuran (THF) and the sizes of the microparticles were measured by a dynamic light scattering method using a light scattering photometer, ELS-8000 (manufactured by Otsuka Electronics Co., Ltd.).

2) Polymerization Conversion Rate

The amount of remaining monomers was determined by gas chromatography or liquid chromatography and calculated.

Example 1

<Production of Monodispersed Organic Seed Particle (A1)>

To a four-neck flask of 500 mL in volume equipped with a condenser tube, a thermometer, a stirrer and a nitrogen inlet pipe, 10.8 g of styrene (St), 0.108 g of divinylbenzene (DVB55, purity: 55%, content of ethyl vinyl benzene: 45%), 0.0216 g of sodium p-styrene sulfonate (NaSS) and ion exchange water (320 g) were poured. The reaction solution was mixed while stirring under nitrogen airflow and heated to 75° C. Subsequently, 0.0108 g of potassium persulfate dissolved in 30 g of ion exchange water was added to the above reaction solution and subjected to a polymerization reaction performed at 75° C. for 7 hours and then cooled to room temperature. In this way, a water dispersion of the monodispersed organic seed particles (A1) was obtained. The average particle size of the resultant seed particles (in water) was 201 nm and the CV value was 8%.

<Production of Monodisperse Crosslinked Microparticle (B1) Containing an Alkoxyamine Group>

To the above water dispersion of the monodispersed organic seed particles (A1), sodium dodecylbenzene sulfonate (0.325 g) was added and mixed while stirring at room temperature under nitrogen airflow. To this, a m/p-form mixture of 2-(4'-hydroxy-2',2',6',6'-tetramethyl-1'-piperidinyloxy)-2-(3'-vinylphenyl)ethanol and 2-(4'-hydroxy-2',2',6',6-tetramethyl-1'-piperidinyloxy)-2-(4'-vinylphenyl)ethanol (compound D1 shown below, purity: 98%, m/p ratio=57/43, 1.08 g) dissolved in DVB (9.74 g) was gradually added and mixed while stirring at room temperature for one hour. By this operation, the monodispersed organic seed particles were impregnated with the mixture.

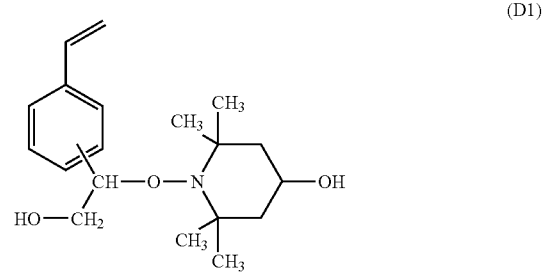

(D1)

Heating was performed to 75° C. and potassium persulfate (0.108 g) was dissolved in ion exchange water (30 g) and then added to the reaction solution obtained above. After a polymerization reaction was performed at 75° C. for 7 hours, the reaction solution was cooled to room temperature. The polymerization conversion rate in all monomers was 95% or more. Aggregates in the polymerization reaction solution obtained were filtered off by a nylon mesh to obtain a microparticle dispersion. The microparticle dispersion was salted out, filtrated, washed with water and methanol, and dried under reduced pressure to obtain the monodisperse crosslinked microparticle (B1) containing an alkoxyamine group. The yield of the crosslinked microparticles was 92%. The average particle size in water was 256 nm and the CV value was 11%. The average particle size in THF was 259 nm and the CV value was 11%.

Example 2

<Production of Monodispersed Organic Seed Particle (A2)>

To a four-neck flask of 500 mL in volume equipped with a condenser tube, a thermometer, a stirrer and a nitrogen inlet pipe, St (108 g) and ion exchange water (320 g) were placed, mixed while stirring under nitrogen airflow and heated to 75° C. Subsequently, potassium persulfate (0.0108 g) dissolved in ion exchange water (30 g) was added to the above reaction solution, subjected to a polymerization reaction performed at 75° C. for 7 hours and then cooled to room temperature. In this way, a water dispersion of the monodispersed organic seed particles (A2) was obtained. The average particle size of the seed particle in water was 338 nm and the CV value was 7%.

<Production of Monodisperse Crosslinked Microparticle (B2) Containing an Alkoxyamine Group>

To the above water dispersion of the monodispersed organic seed particles (A2), sodium dodecylbenzene sulfonate (0.325 g) was added and mixed while stirring at room temperature under nitrogen airflow. To this, a mixture of the compound D1 (1.62 g) and 2,2'-azobisisobutyronitrile (0.0540 g) dissolved in DVB (30.8 g) was gradually added and mixed while stirring at room temperature for one hour. By this operation, the monodispersed organic seed particles were impregnated with the mixture. This was heated to 75° C. and a polymerization reaction was performed at 75° C. for 7 hours and then cooled to room temperature. The polymerization conversion rate in all monomers was 95% or more. Aggregates in the resultant polymerization reaction solution were filtered off by a nylon mesh to obtain a microparticle dispersion. The microparticle dispersion was salted out, filtrated, washed with water and methanol and dried under reduced pressure to obtain the monodisperse crosslinked microparticles (B2) containing an alkoxyamine group. The yield of the resultant crosslinked microparticles was 85%. The average particle size in water was 545 nm and the CV value was 11%. The average particle size in THF was 558 nm and the CV value was 10%.

Example 3

<Production of Monodispersed Organic Seed Particle (A3)>

A water dispersion of the monodispersed organic seed particles (A3) was obtained in accordance with the method of Example 1 except that the addition amount of NaSS was changed to 0.108 g. The average particle size of the seed particles obtained in water was 132 nm and the CV value was 8%.

<Production of Monodisperse Crosslinked Microparticle (B3) Containing an Alkoxyamine Group>

The monodisperse crosslinked microparticles (B3) containing an alkoxyamine group was obtained in the method according to Example 1 except that 2-isopropyloxycarbonyloxy-1-(N-t-butyl-N-(1'-diethylphosphono-2',2'-dimethylpropyl)aminooxy)-1-(4'-vinylphenyl) ethane (compound D2 shown below, purity: 97%) was used in place of the compound D1. The yield of the resultant crosslinked microparticles was 90%. The average particle size in water was 170 nm and the CV value was 12%. The average particle size in THF was 177 nm and the CV value was 14%.

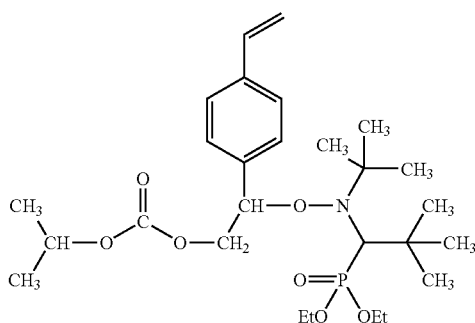

(D2)

Example 4

<Production of Seed Particle (A4)>

To a four-neck flask of 500 mL in volume equipped with a condenser tube, a thermometer, a stirrer and a nitrogen inlet pipe, 10.8 g of methyl methacrylate (MMA), 0.0108 g of ethylene glycol dimethacrylate (EGDM) and ion exchanged water (320 g) were placed, mixed while stirring under nitrogen airflow and heated to 75° C. Subsequently, potassium persulfate (0.0108 g) dissolved in ion exchange water (30 g) was added to the above reaction solution, and subjected to a polymerization reaction performed at 75° C. for 7 hours and then cooled to room temperature. In this way, a water dispersion of the monodispersed organic seed particles (A4) was obtained. The average particle size of the resultant seed particle in water was 482 nm and the CV value was 6%.

<Production of Monodisperse Crosslinked Microparticle (B4) Containing an Alkoxyamine Group>

To the above water dispersion of monodispersed organic seed particles (A4), sodium dodecylbenzene sulfonate (0.325 g) was added and mixed while stirring at room temperature under nitrogen airflow. To this, a mixture of the compound D1 (1.08 g) dissolved in MMA (7.04 g), EGDM (2.71 g) and t-butylperoxy-2-ethyl hexanoate (0.0540 g) was gradually added and mixed while stirring at room temperature for one hour. By this operation, the monodispersed organic seed particles were impregnated with the mixture. This was heated to 75° C. and a polymerization reaction was performed at 75° C. for 7 hours and then cooled to room temperature. The polymerization conversion rate in all monomers was 95% or more. Aggregates in the polymerization reaction solution were filtered off by a nylon mesh to obtain a microparticle dispersion. The microparticle dispersion was salted out, filtrated, washed with water and methanol and dried under reduced pressure to obtain the monodisperse crosslinked microparticles (B4) containing an alkoxyamine group. The yield of the resultant crosslinked microparticles was 85%. The average particle size in water was 613 nm and the CV value was 9%. The average particle size in THF was 633 nm and the CV value was 11%.

Example 5

<Production of Monodispersed Organic Seed Particle (A5)>

To a four-neck flask of 500 mL in volume equipped with a condenser tube, a thermometer, a stirrer and a nitrogen inlet pipe, St (10.8 g), DVB55 (0.0542 g), NaSS (0.0542 g) and ion exchanged water (320 g) were placed, mixed while stirring under nitrogen airflow and heated to 75° C. Subsequently, potassium persulfate (0.0108 g) dissolved in ion exchange water (30 g) was added to the above reaction solution, subjected to a polymerization reaction performed at 75° C. for 7 hours and then cooled to room temperature. In this way, a water dispersion of the monodispersed organic seed particles (A5) was obtained. The average particle size of the resultant seed particles in water was 171 nm and the CV value was 9%.

<Production of Monodisperse Crosslinked Microparticle (B5) Containing an Alkoxyamine Group>

To the above water dispersion of the monodispersed organic seed particles (A2), sodium dodecylbenzene sulfonate (0.325 g) was added and mixed while stirring at room temperature under nitrogen airflow. To this, a mixture of 2-isopropyloxycarbonyloxy-1-(4'-acetoxy-2',2',6',6'-tetramethyl-1'-piperidinyloxy)-1-(4'-vinylphenyl)ethane (compound D3 shown below, 2.166 g) and 2,2'-azobisisobutyronitrile (0.0540 g) dissolved in divinylbenzene (DVB: 5.415 g) was gradually added and mixed while stirring at room temperature for one hour. By this operation, the seed particles were impregnated with the mixture.

Subsequently, this was heated to 75° C. and a polymerization reaction was performed at 75° C. for 7 hours and then cooled to room temperature. The polymerization conversion rate in all monomers was 95% or more. Aggregates in the resultant polymerization reaction solution were filtered off by a nylon mesh to obtain a microparticle dispersion. The microparticle dispersion was salted out, filtrated, washed with water and methanol and dried under reduced pressure to obtain the monodisperse crosslinked microparticles (B5) containing an alkoxyamine group. The yield of the resultant crosslinked microparticles was 87%. The average particle size in water was 195 nm and the CV value was 13%. The average particle size in THF was 201 nm and the CV value was 14%.

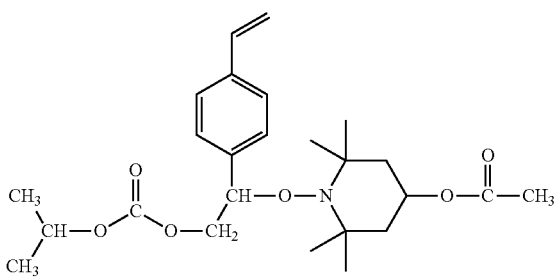

(D3)

Comparative Example 1

<Production of Monodisperse Crosslinked Microparticle Containing an Alkoxyamine Group (A6)>

To a four-neck flask of 500 mL in volume equipped with a condenser tube, a thermometer, a stirrer and a nitrogen inlet pipe, ion exchanged water (320 g) was placed and a mixture of Compound D1 (0.325 g) dissolved in St (10.8 g) and DVB55 (0.216 g) was added. The resultant solution was mixed while stirring under nitrogen airflow and heated to 75° C. Subsequently, potassium persulfate (0.0216 g) dissolved in ion exchange water (30 g) was added to the above reaction solution and subjected to a polymerization reaction performed at 75° C. for 7 hours and then cooled to room temperature. The polymerization conversion rate in all monomers was 95% or more. Aggregates in the resultant polymerization reaction solution were filtered off by a nylon mesh to obtain a microparticle dispersion. The microparticle dispersion was salted out, filtrated, washed with water and methanol and dried under reduced pressure to obtain the monodisperse crosslinked microparticles (B5) containing an alkoxyamine group. The yield of the resultant crosslinked microparticles was 30%. The average particle size in water was 393 nm and the CV value was 26%. The average particle size in THF was 525 nm and the CV value was 38%.

The results of Examples 1 to 5 and Comparative Example 1 are collectively shown in Table 1. In Table 1, the contents of other components are expressed based on styrene or MMA (100 parts by mass) in producing a seed particle and based on the total amount (100 parts by mass) of a crosslinkable monomer and based on an alkoxyamine group-containing monomer in producing a crosslinked microparticle.

the other hand, in Comparative Example 1, since monodispersed organic seed particles were not used, the CV value was large and the yield was low. In addition, it was found that swelling with an organic solvent was significant since the amount of crosslinkable monomer is low.

Example 6

<Production of Core-Shell Microparticle (C1)>

To N,N-dimethyl formamide ((DMF), 4.88 g), St (6.39 g), n-butyl acrylate (nBA: 3.37 g), 2-(4'-hydroxy-2',2',6',6'-tetramethyl-1'-piperidinyloxy)-2-phenyl ethanol (Compound E1, (0.032 g)) was added and dissolved. Subsequently, the microparticles (B1: 0.70 g) obtained in Example 1 were mixed and dispersed by a homogenizer for 30 minutes. The resultant dispersion was poured into a glass ampule of 20 mL in content. The ampule was purged with nitrogen and sealed. Polymerization was performed at 115° C. for 15 hours. As a result, the polymerization conversion rate of St was 45.7% and that of nBA was 44.2%. To the content, THF (15 mL) was added and microparticles were separated by a centrifuge. The microparticles obtained were washed with THF three times and dried under reduced pressure to obtain 1.80 g of the core-shell microparticles (C1). The average particle size of the resultant core-shell microparticles in THF was 341 nm (0.341 μm) and the CV value was 14%.

Figure 2:
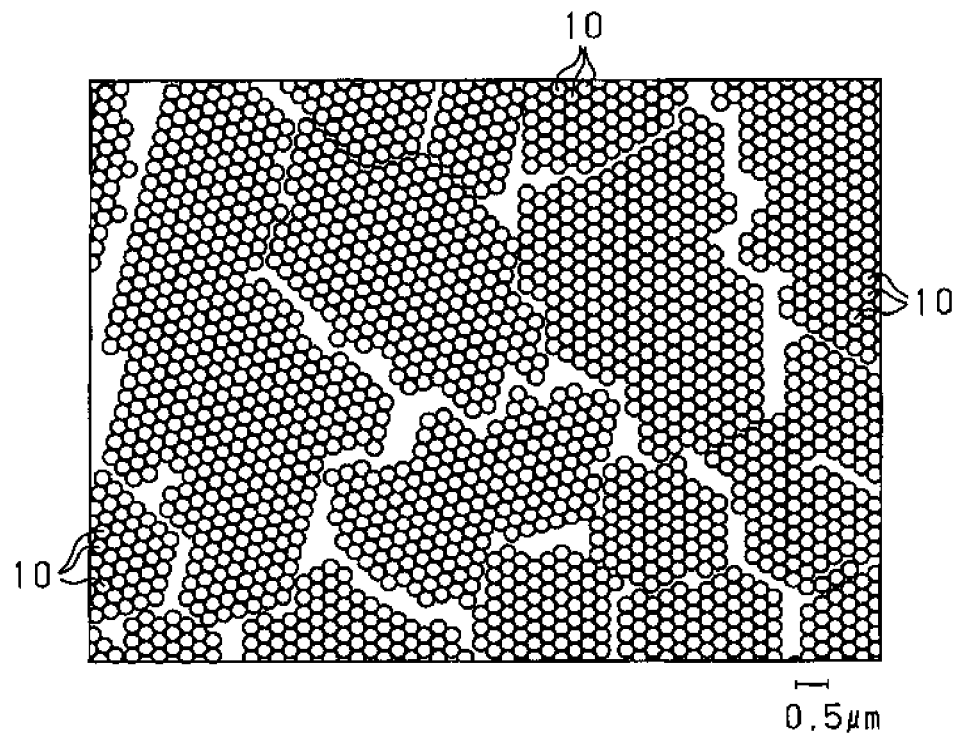
FIG. 2 is a schematic drawing of an electro-micrograph of core-shell microparticles.

An electrophotograph of the core-shell microparticles (C1) 10 thus obtained was taken and schematically drawn in FIG. 2. As is shown in FIG. 2, the core-shell microparticles 10 have nearly spherical shape and uniform in size in the order of submicron in average. Note that the electrophotograph of the

TABLE 1

|  |  | Example 1 | Example 2 | Example 3 | Example 4 | Example 5 | Comp. Example 1 |
|---|---|---|---|---|---|---|---|
| Seed particle | | A1 | A2 | A3 | A4 | A5 | — |
| Monomer composition (parts by mass) | St | 100 | 100 | 100 | — | 100 | — |
| | MMA | — | — | — | 100 | — | — |
| | DVB55 | 1 | — | 1 | — | 0.5 | — |
| | EGDM | — | — | — | 0.1 | — | — |
| | NaSS | 0.2 | — | 1 | — | 0.5 | — |
| Average particle size in water (nm) | | 201 | 338 | 132 | 480 | 171 | — |
| CV value in water (%) | | 8 | 7 | 8 | 6 | 9 | — |
| Crosslinked microparticle | | B1 | B2 | B3 | B4 | B5 | B6 |
| Monomer composition (parts by mass) | DVB55 | 90 | 95 | 90 | — | — | 40 |
| | DVB | — | — | — | — | 71 | — |
| | EGDM | — | — | — | 71 | — | — |
| | Compound D1 | 10 | 5 | — | 29 | — | 60 |
| | Compound D2 | — | — | 10 | — | — | — |
| | Compound D3 | — | — | — | — | 29 | — |
| | MMA | — | — | — | 186 | — | — |
| | St | — | — | — | — | — | 2000 |
| Yield (%) | | 92 | 85 | 90 | 86 | 87 | 30 |
| Average particle size in water (nm) | | 256 | 545 | 170 | 613 | 195 | 393 |
| CV value in water (%) | | 11 | 11 | 12 | 9 | 13 | 26 |
| Average particle size in THF (nm) | | 259 | 558 | 177 | 633 | 201 | 525 |
| CV value in THF (%) | | 11 | 10 | 14 | 11 | 14 | 38 |

From the results shown in Table 1, it was found that monodisperse crosslinked microparticles containing an alkoxyamine group having a uniform submicron particle size can be obtained. In addition, since the average particle sizes in water and in a good solvent, THF, are nearly equal, it was found that swelling caused by an organic solvent is not significant. In other words, the crosslink density of each of the crosslinked microparticles was demonstrated to be high. On core-shell microparticles (C1) will be submitted separately as an attachment to submission of information.

Example 7

<Production of Core-Shell Microparticle (C2)>

DMF (4.40 g), chloromethylstyrene (CMS, m/p form mixture: 8.81 g) and microparticles (B2: 1.00 g) obtained in Example 2 were mixed and dispersed by a homogenizer for 30 minutes. The resultant dispersion was poured into a glass ampule of 20 mL in content. The ampule was purged with nitrogen and sealed. Polymerization was performed at 115° C. for 9 hours. As a result, the polymerization conversion rate of CMS was 32.0%. To the content, 15 mL of THF was added and microparticles were separated by a centrifuge. The microparticles obtained were washed with THF three times and dried under reduced pressure to obtain 1.92 g of the core-shell microparticles (C2). The average particle size of the core-shell microparticles (C2) obtained in THF was 669 nm and the CV value was 11%.

Example 8

<Production of Core-Shell Microparticle (C3)>

To DMF (5.10 g) and nBA (10.20 g), 2-isopropyloxycarbonyloxy-1-(N-t-butyl -N-(1'-diethylphosphono-2',2'-dimethylpropyl)aminooxy)-1-phenyl ethane (compound E2: 0.033 g) was added and dissolved. Subsequently, the microparticles (B3: 0.70 g) obtained in Example 3 were added, mixed and dispersed by a homogenizer for 30 minutes. The resultant dispersion was poured into a glass ampule of 20 mL in content. The ampule was purged with nitrogen and sealed. Polymerization was performed at 115° C. for 15 hours. As a result, the polymerization conversion rate of nBA was 43.0%. To the content, 15 mL of THF was added and microparticles were separated by a centrifuge. The microparticles obtained were washed with THF three times and dried under reduced pressure to obtain 2.10 g of the core-shell microparticles (C3). The average particle size of the core-shell microparticles (C2) obtained in THF was 282 nm and the CV value was 14%.

Example 9

<Production of Core-Shell Microparticle (C4)>

To DMF (4.57 g) and St (9.13 g), the above compound E1 (0.032 g) was added and dissolved. Subsequently, the microparticles (B4: 0.70 g) obtained in Example 4 were added, mixed and dispersed by a homogenizer for 30 minutes. The resultant dispersion was poured into a glass ampule of 20 mL in content. The ampule was purged with nitrogen and sealed. Polymerization was performed at 115° C. for 15 hours. As a result, the polymerization conversion rate of St was 47.0%. To the content, THF (15 mL) was added and microparticles were separated by a centrifuge. The microparticles obtained were washed with THF three times and dried under reduced pressure to obtain 1.85 g of the core-shell microparticles (C4). The average particle size of the core-shell microparticle obtained in THF was 708 nm and the CV value was 12%.

Example 10

<Production of Core-Shell Microparticle (C5)>

To DMF (3.80 g), CMS (5.59 g) and nBA (2.01 g), the microparticles (B5: 1.00 g) obtained in Example 5 was added, mixed and dispersed by a homogenizer for 30 minutes. The resultant dispersion was poured into a glass ampule of 20 mL in content. The ampule was purged with nitrogen and sealed. Polymerization was performed at 115° C. for 9 hours. As a result, the polymerization conversion rate of CMS was 44.3% and that of nBA was 38.8%. To the content, THF (15 mL) was added and microparticles were separated by a centrifuge. The microparticles obtained were washed with THF three times and dried under reduced pressure to obtain 1.98 g of the core-shell microparticle (C5). The average particle size of the core-shell microparticles obtained in THF was 308 nm and the CV value was 15%.

Comparative Example 2

<Production of Core-Shell Microparticle (C6)>

Polymerization was performed in accordance with the method of Example 5 except that the alkoxyamine group-containing monodisperse crosslinked microparticle was changed to the microparticle of B6. The polymerization conversion rate of St was 45.2% and that of nBA was 43.2%. To the content, THF (15 mL) was added and microparticles were separated by a centrifuge. The microparticles obtained were washed with THF three times and dried under reduced pressure to obtain 1.95 g of the core-shell microparticles (C5). The average particle size of the core-shell microparticles obtained were 3120 nm and the CV value was 40%. The results of Examples 6 to 10 and Comparative Example 2 were collectively shown in Table 2. In Table 2, the contents of other components were expressed based on crosslinked microparticles (100 parts by mass).

TABLE 2

| | | Example 6 | Example 7 | Example 8 | Example 9 | Example 10 | Comp. Example 2 |
|---|---|---|---|---|---|---|---|
| Core-shell microparticle | | C1 | C2 | C3 | C4 | C5 | C6 |
| Monomer composition (parts by mass) | Crosslinked microparticle | 100 (B1) | 100 (B2) | 100 (B3) | 100 (B4) | 100 (B5) | 100 (B6) |
| | St | 913 | — | — | 1305 | — | 913 |
| | nBA | 481 | — | 1457 | — | 201 | 481 |
| | CMS | — | 881 | — | — | 559 | — |
| | Compound E1 | 4.6 | — | — | 4.6 | — | 4.6 |
| | Compound E2 | — | — | 4.8 | — | — | — |
| Average particle size in THF (nm) | | 341 | 692 | 282 | 708 | 308 | 3120 |
| CV value in THF (%) | | 14 | 11 | 14 | 12 | 15 | 40 |

From the results of Examples 6 to 10 shown in Table 2, it was found that monodispersed core-shell microparticles having a narrow particle size distribution can be obtained. On the other hand, in Comparative Example 2, since no seed particle is used and the second monomer (St), which is used for forming a core microparticle, is contained in a large amount, and relatively, the content of the crosslinkable monomer is low. As a result, a core microparticle is swollen by a monomer and polymerization proceeds within the core microparticle. Thus, it was found that desired microparticle of a submicron size cannot be obtained.

The embodiment may be modified as follows.

As a crosslinkable monomer, a bifunctional monomer having two vinyl groups and a multifunctional monomer having not less than three vinyl groups may be used in combination. In this way, the cross link density of crosslinkable microparticles can be controlled.

A plurality of alkoxyamine group-containing monomers are selected and used to control the living radical polymerization initiation ability.

In producing a core-shell microparticle, a polymerization initiator or a polymerization activating catalyst can be blended to increase a polymerization rate. As the polymerization activating catalyst, Broensted acid such as an organic sulfonic acid and an organic carboxylic acid and an acylating agent such as an acid anhydride and an acid chloride may be used.

The invention claimed is:

1. A method for producing a core-shell microparticle comprising:
   preparing a monomer mixture containing 15 to 99% by mass of a crosslinkable monomer having a plurality of vinyl groups and 1 to 85% by mass of an alkoxyamine group-containing monomer;
   producing a monodispersed organic seed particle by polymerizing an oil soluble monomer in an aqueous medium that does not dissolve both of the oil soluble monomer and the monodispersed organic seed particle;
   impregnating the monodispersed organic seed particle that is dispersed in the aqueous medium with the monomer mixture that contains the alkoxyamine group-containing monomer;
   adding a polymerization initiator to initiate polymerization of the monomer mixture that is absorbed in the monodispersed organic seed particle to produce a monodisperse crosslinked microparticle having an alkoxyamine group introduced thereto; and
   heating the monodisperse crosslinked microparticle and a monomer to perform graft polymerization.

2. The method for producing a core-shell microparticle according to claim 1, wherein the temperature of the graft polymerization is 100 to 180° C.

3. A method for producing a monodisperse crosslinked microparticle containing an alkoxyamine group, the method comprising:
   preparing a monomer mixture containing 15 to 99% by mass of a crosslinkable monomer having a plurality of vinyl groups and 1 to 85% by mass of an alkoxyamine group-containing monomer;
   producing a monodispersed organic seed particle by polymerizing an oil soluble monomer in an aqueous medium that does not dissolve both of the oil soluble monomer and the monodispersed organic seed particle;
   impregnating the monodispersed organic seed particle that is dispersed in the aqueous medium with the monomer mixture that contains the alkoxyamine group-containing monomer; and
   adding a polymerization initiator to initiate polymerization of the monomer mixture that is absorbed in the monodispersed organic seed particle to introduce an alkoxyamine group into the surface of the monodispersed organic seed particle.

4. The method for producing a monodisperse crosslinked microparticle containing an alkoxyamine group according to claim 3, wherein the alkoxyamine group-containing monomer is a monomer represented by the following general formula (1):

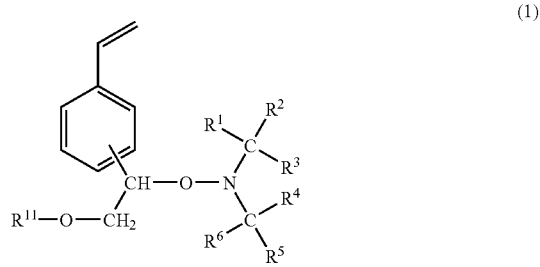

(1)

where $R^1$ to $R^6$ are each independently selected and represent hydrogen, a hydrocarbon group ($-R^7$), an ester group ($-COOR^8$), an alkoxy group ($-OR^9$) or a phosphonate group)($-PO(OR^{10})_2$), wherein $R^7$ to $R^{10}$ each independently represent a straight chain, branched chain or cyclic saturated or unsaturated hydrocarbon group having 1 to 8 carbon atoms; and $R^3$ and $R^4$ may be mutually joined to form a ring having 3 to 12 carbon atoms, the hydrogen atom present on the ring may be unsubstituted or substituted by an alkyl group having 1 to 4 carbon atoms, a hydroxyl group, an acetoxy group, a benzoyloxy group, a methoxy group or an oxo group; $R^{11}$ represents hydrogen, a tertiary alkyl group having 4 to 8 carbon atoms, benzoyl group, methylbenzoyl group, or a $COOR^{12}$ group; $R^{12}$ represents a straight chain or branched chain alkyl group or alkoxyalkyl group having 1 to 10 carbon atoms; or an unsubstituted cycloalkyl group or a cycloalkyl group having a substituent on the ring.

5. The method for producing a monodisperse crosslinked microparticle containing an alkoxyamine group according to claim 3, wherein an average particle size of the alkoxyamine group-containing monodisperse crosslinked microparticle measured by a dynamic light scattering method in a good solvent is 50 to 900 nm, and a CV value to be calculated in accordance with the expression:

(Particle size standard deviation/average particle size) ×100 is 20% or less.

6. The method for producing a monodisperse crosslinked microparticle containing an alkoxyamine group according to claim 3, wherein the seed particle has an average particle size of 10 to 800 nm and the CV value of the seed particle is 20% or less.

7. The method for producing a monodisperse crosslinked microparticle containing an alkoxyamine group according to claim 3, wherein the seed particle is crosslinked microparticle obtained by blending a non-crosslinked particle or not more than 2% by mass of a crosslinkable monomer with respect to monomers used for producing the monodispersed organic seed particle and polymerizing.

* * * * *

UNITED STATES PATENT AND TRADEMARK OFFICE
CERTIFICATE OF CORRECTION

| | | |
|---|---|---|
| PATENT NO. | : 8,404,762 B2 | Page 1 of 1 |
| APPLICATION NO. | : 12/530387 | |
| DATED | : March 26, 2013 | |
| INVENTOR(S) | : Masaki Hayashi et al. | |

It is certified that error appears in the above-identified patent and that said Letters Patent is hereby corrected as shown below:

In the Specifications

Column 9, Line 47:

Delete "15 to 99" and insert --15 to 99%--.

Signed and Sealed this
Eleventh Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO.      : 8,404,762 B2                Page 1 of 1
APPLICATION NO. : 12/530387
DATED           : March 26, 2013
INVENTOR(S)     : Hayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this

First Day of September, 2015

Michelle K. Lee
*Director of the United States Patent and Trademark Office*